United States Patent [19]

Kunicki et al.

[11] Patent Number: 4,504,446
[45] Date of Patent: Mar. 12, 1985

[54] OZONE GENERATOR

[75] Inventors: Wojciech Kunicki, Warsaw, Poland; Gilbert S. Jackson, Bethesda, Md.

[73] Assignee: OPT Systems, Bethesda, Md.

[21] Appl. No.: 324,916

[22] Filed: Nov. 25, 1981

[51] Int. Cl.$^3$ .............................................. C01B 13/11
[52] U.S. Cl. ........................... 422/186.19; 422/186.18; 422/186.20
[58] Field of Search ...................... 422/186.19, 186.18, 422/186.20, 186.22, 186.25, 186.11

[56] References Cited

U.S. PATENT DOCUMENTS

| | | | |
|---|---|---|---|
| 1,834,705 | 12/1931 | Hartman | 422/186.19 |
| 2,010,081 | 8/1935 | Hartman | 422/186.19 |
| 2,952,606 | 9/1960 | Pascale et al. | 422/186.1 |
| 3,214,364 | 10/1965 | Van Tuyle et al. | 422/186.19 |
| 3,296,116 | 1/1967 | Leviel | 422/186.19 |
| 3,671,417 | 6/1972 | Louboutin | 422/186.18 |
| 3,903,426 | 9/1975 | Lowther | 250/532 |
| 4,013,567 | 3/1977 | Emelyanov et al. | 422/186.19 |
| 4,090,960 | 5/1978 | Cooper | 210/63 |
| 4,234,800 | 11/1980 | Kenly et al. | 422/186.19 |

FOREIGN PATENT DOCUMENTS

| | | | |
|---|---|---|---|
| 0076292 | 6/1977 | Japan | 422/186.19 |
| 0060392 | 5/1978 | Japan | 422/186.19 |
| 0162408 | 12/1980 | Japan | 422/186.19 |
| 1528731 | 10/1978 | United Kingdom | 30/371 |

OTHER PUBLICATIONS

Translation of Polish Patent No. 111,484 issued Feb. 28, 1980.

Primary Examiner—Stephen J. Lechert, Jr.
Assistant Examiner—Howard J. Locker
Attorney, Agent, or Firm—Beveridge, DeGrandi & Kline

[57] ABSTRACT

The invention relates to an air-cooled ozone generator of tubular type which has a tubular outer electrode, a tubular dielectric, for instance of glass, arranged inside the outer electrode, and an inner electrode in the form of a metal coating on the inner side of the dielectric. The outer electrode and the dielectric are spaced apart and the resulting intermediate annular gap forms a discharge space in which oxygen is converted to ozone. The ozone generator is operated by means of a low-voltage, high-frequency AC source connected to the electrodes. The outer electrode has cooling flanges, and inside the inner electrode there is provided at least one heat dissipating metal body insertable in the inner electrode and expandable to abutment against the inner electrode. Preferably, the metal body also serves as an electric connection for connecting the inner electrode to the voltage source. The metal body preferably consists of a sheet formed into a cylinder with two inwardly directed flanges.

19 Claims, 3 Drawing Figures

OZONE GENERATOR

BACKGROUND OF THE INVENTION

The present invention relates to a novel and efficient, air-cooled ozone generator of tubular type.

Ozone is an allotropic modification of oxygen which is formed by the condensation of three oxygen molecules to two ozone molecules. Ozone is present in the atmosphere to a varying extent and is continuously formed in the outer layer of the atmosphere by the action of the ultraviolet rays of the sun on atmospheric oxygen. Ozone, which is a powerful oxidizer, has a disinfecting and deodorizing effect and is used, inter alia, for disinfecting water, for instance to form potable water, for treatment of industrial wastes, and for the inhibition of fungal, bacterial and viral growth in stores. Ozone can be used for these purposes with most all agricultural products.

The preparation of ozone has been known for a long time and is performed by electric discharge in a space between two electrodes. This space houses a dielectric, such as glass. The discharge space between one electrode and the dielectric in general is of the order of 2–3 mm. The discharge, which is produced by connecting the electrodes to a high-voltage AC source, is of the quiet electric discharge type or the corona or convection discharge type.

All commercial ozone generators are based on the same fundamental principle but differ in respect of component design, dimensions, cooling, electrode design, dielectric etc. Minaturized gas-cooled ozone generators are usually constructed with a single pair of plate or tubular electrodes with an intermediate plate or tubular dielectric. Of prior art ozone generators mention should be made in particular of those disclosed in the following patent specifications.

British Patent Specification No. 1,528,731 describes a tubular ozone generator of the type including an inner electrode, a coaxial outer electrode surrounding the inner electrode, and a tubular dielectric disposed between the inner and outer electrodes. Characteristic of the device of this patent specification is that the discharge space in which the ozone is produced is in the form of a helical path. In addition, the outer electrode is provided with axial cooling ribs or fins.

U.S. patent specification No. 3,214,364 relates to an improvement of the well-known Welsbach-Traligaz ozonator. The ozonator according to this patent specification has a water-cooled tubular outer electrode, a tubular inner electrode of metal, for instance a wire mesh, and a tubular dielectric, such as a glass tube, which is arranged concentrically between and spaced from the outer and inner electrodes. One end of the glass tube is provided with a plate having an orifice which restricts gas flow through the tube.

U.S. patent specification No. 1,834,705 relates to a tubular ozone generator characterized by a corrugated sheet of heat conducting metal, such as copper, which surrounds the dielectric and the outer electrode to conduct heat therefrom.

A major portion of the electric energy supplied to an ozone generator is released in the form of heat, which has an adverse effect on the ozone yield. The decomposition reaction of the ozone to form oxygen will predominate over the reverse reaction in which ozone is formed from oxygen at as low a temperature as 40° C. Hence, it is of decisive importance that the ozone generator is provided with efficient cooling. The problem of obtaining efficient cooling is encountered in particular in gas-cooled ozone generators, for instance miniaturized portable ones, in which it is not possible or expedient to resort to water-cooling, oil- or other fluid-cooling. Further, efficient cooling is vital because overheating of the dielectric will considerably shorten its life. For instance, inefficient cooling may cause overheating and cracking of the dielectric, thus making the ozone generator unusable. Gas-cooling of the ozone generator allows the unit to be lighter in weight, more portable and more compact.

BRIEF SUMMARY OF THE INVENTION

The object of the present invention is to overcome the problems encountered in prior art ozone generators and to provide a gas-cooled ozone generator of improved construction and in particular an ozone generator of this type with efficient air-cooling of the outer electrode, the inner electrode and the dielectric.

More particularly, the invention relates to a gas-cooled ozone generator having paired tubular concentric electrodes and a dielectric disposed therebetween, the ozone generator being characterized in that the outer electrode is provided with cooling flanges, and that cooling of the dielectric and of the inner electrode is effected by means of at least one expandable body which is disposed inside the inner electrode, against which it abuts, and which is open to throughflow of gas.

Further characteristics of the invention will be appreciated from the accompanying description and drawing.

DESCRIPTION OF THE DRAWING

A better understanding of the invention will be had by the following detailed description with reference to the accompanying figures of the drawing, in which.

DETAILED DESCRIPTION OF PREFERRED EMBODIMENTS

Figure 1:
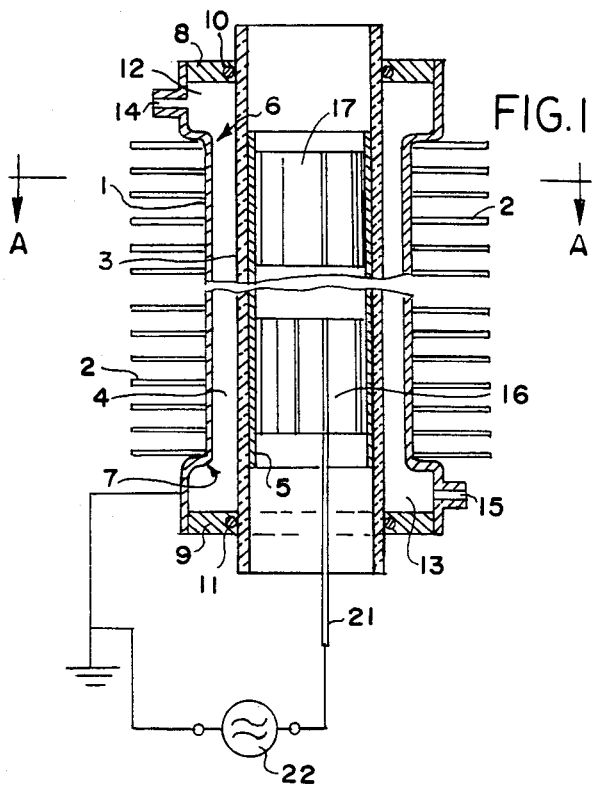
FIG. 1 is a schematic longitudinal section of a preferred embodiment of the ozone generator according to the invention.
Figure 2:
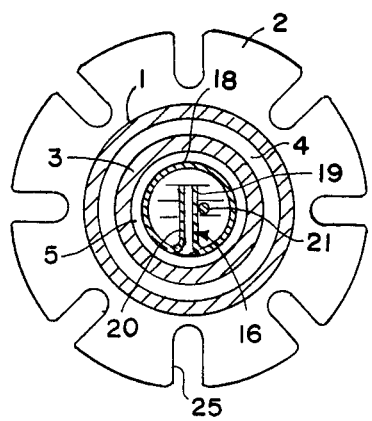
FIG. 2 is a cross-sectional view taken along the line A—A of the ozone generator in FIG. 1.

The ozone generator illustrated in FIGS. 1 and 2 consists of a tubular outer electrode 1 which is provided with cooling flanges, vanes or fins 2. In operation, the inner side of the outer electrode 1 is exposed to corrosive conditions, for which reason it should be made of a corrosion-resistant material, such as steel, preferably stainless steel, as opposed to, for instance, aluminum which would corrode. Another possibility is to coat the inner side of the outer electrode 1 with an electrically conductive, corrosion-resistant material, such as chromium or nickel. The cooling flanges 2, on the other hand, are not exposed to the corrosive atmosphere prevailing at the inner side of the electrode 1 and, hence, may be manufactured of an inexpensive material having good thermal conductivity, such as aluminum or an alloy thereof.

A tube 3 of a dielectric material, such as glass, is arranged concentrically inside the outer electrode 1. The tube 3 should be selected from a material having the highest possible dielectric constant. While tube 3 is described as being of hollow cylindrical shape, it will be understood that hollow tubes of similar geometric shape can be employed. The tube 3 is spaced from the outer electrode 1, such that an annular gap 4 is formed between the outer electrode 1 and the dielectric tube 3. This gap 4 being of the order of 0.5–1.5 mm forms the electric discharge space.

The inner side of the dielectric tube 3 is provided with an electrically conductive metal coating 4 which serves as inner electrode. The metal coating 5 preferably consists of pure aluminum or of a suitable aluminum alloy, such as AlSi (silumin). The coating is applied to the inner side of the dielectric 3 in a per se known manner by vacuum deposition or flame metallization. In another embodiment of this invention, the inner electrode can comprise an electrically conductive metal coated by a per se known fluidized process with a dielectric material where the thickness of the dielectric is a function of the characteristics of the known electric supply for the ozone generator. Vacuum deposition is preferably used for dielectric tubes of small dimensions, e.g., tubes with an inner diameter of up to 50 mm, whereas flame metallization to a thickness of about 3 to about 50 microns is advantageously used for larger dimensions. Further, in the case of vacuum deposition, the thickness of the applied coating preferably is about 2 to about 5 microns, whereas in the case of flame metallization it advantageously is of the order of about 25 to about 55 microns.

In still another embodiment of this invention, the metal coating 5 can be covered with a corrosion-resistant layer (not shown in the drawing). For example, a silver coating 5 can be covered by an electrically conductive silicon coating to prevent oxidation of the silver.

As will be seen from FIG. 1, the metal coating 5 terminates at a distance from the outer ends of the dielectric tube 3. This distance varies within the range of about 10–120 mm depending on the voltage and frequency at which the ozone generator operates. Similarly, the outer electrode 1 terminates at the same distance from the ends of the dielectric tube as does the inner electrode 5 in that the outer electrode deflects in a direction away from the dielectric tube at 6 and 7. The thus widened outer electrode tube 1 is sealed with respect to the dielectric tube 3 by means of annular spacers 8, 9. In order to obtain optimum sealing with respect to the dielectric tube 3, the spacers preferably are also provided with seals, such as sealing rings 10, 11 of the O-ring type or similar shapes of non-conductive and ozone-resistant material, like silicone or sulfonated rubber. Thus, at one end of the outer electrode there is formed an annular collecting chamber 12 for inflowing oxygen-containing gas, such as air or oxygen, and at the other end there is formed an annular collecting chamber 13 for outflowing ozone-containing gas. The inflowing gas enters in the collecting chamber 12 by an inlet conduit 14, while the outflowing ozone-containing gas leaves through an outlet conduit 15.

To permit free passage of cooling gas, such as air, through the ozone generator, the dielectric tube 3 is open at both ends. The cooling gas carries away from the ozone generator heat produced in the dielectric. However, the thus obtained cooling being not sufficient, an important and characteristic feature of the invention is the provision in the cylindrical channel within the dielectric tube 3, of at least one electrically conductive body 16, 17 which serves to conduct heat from the inner electrode 5 and the dielectric 3. While the body 16, 17 can be comprised of any electrically and thermally conductive material, it is preferably comprised of a metal having good thermal conductivity, such as aluminum. In addition, the electrically conductive body 16, 17 is expandable or resilient so as to abut firmly against the inner electrode 5 to make good contact therewith. Furthermore, since the body 16, 17 should allow cooling gas throughflow in the channel within the dielectric tube, it must be of an "open" construction.

In order to avoid damage to the relatively vulnerable inner electrode coating 5 as the body 16, 17 is installed, the body is collapsible or contractable, such that its outer diameter becomes smaller than the inner diameter of the inner electrode. Upon such contraction of the body it can readily be inserted in the inner electrode, whereupon it is expanded to abutment against the inner electrode. A preferred design of the body 16, 17 is shown in FIGS. 1 and 2. As appears best from FIG. 2, the body 16 consists of a sheet, such as a light weight metal or metal alloy sheet, formed into an open cylinder shape 18 terminating in two inwardly directed flanges 19, 20. Preferably, the sheet is comprised of aluminum. When in a non-actuated state, the flanges 19, 20 are spaced from each other, but by seizing the flanges 19, 20 and urging them towards each other, the cylinder 18 can be compressed for insertion in the inner electrode 5. As illustrated in FIGS. 1 and 2, a plurality of relatively short bodies 16, 17 can be arranged in succession inside the inner electrode. In this case, the inwardly directed flanges 19, 20 of each body 16, 17 can be positioned to face a different portion of the circumference of the electrode 5. Staggering the flanges in this manner imparts turbulence to the cooling gas thereby increasing heat transfer away from the dielectric 3. As an alternative, it is possible to use a single body which extends over the entire length of the inner electrode. In this case, the body serves the additional function of protecting the electrode 5 from mechanical damage as may arise, for example, if dirt entered the device with the cooling gas.

In a preferred embodiment of this invention, the body 16, 17 is fabricated from a material, such as metallic sheet material, having a heat capacity greater than the heat capacity of the electrode 5. For example, this can be conveniently accomplished by fabricating the body from a metal sheet material having a thickness greater than the thickness of electrode coating 5. During operation of the ozone generator, the body 16, 17 then acts as a heat sink further protecting the dielectric 3 and electrode 5 from thermal damage.

As further intimated in FIGS. 1 and 2, the body 16 still has another function, i.e., it serves not only as cooling means but also as an electric connection to the inner electrode. To this end, a terminal lead 21 is fixed to the body, for instance by soldering or welding. The terminal lead 21 is connected to a low-voltage, high-frequency AC source 22, which by an earth connection is connected to the outer electrode 1. This AC source preferably is of a type producing a pulsed, non-sinusoidal, high-frequency wave to limit the duration of the electrical charge cycle of the ozone generator while increasing the duration of the electrical discharge cycle for minimum power consumption with maximum ozone production. Such an AC source could preferably operate at a voltage within the range of about 5 to about 8 kV and at a frequency within the range of about 2 to about 6 kHz. These operating parameters are beneficial in order to keep the generation of nitrogen oxides, such as $N_2O_5$, low, which makes it possible to use ordinary ambient air as a source for the ozone, i.e., without drying the air first. Further, the total power consumption of the ozone generator according to the invention is low and usually lies within the range of about 12 to about 14 W/g $O_3$.

Figure 3:
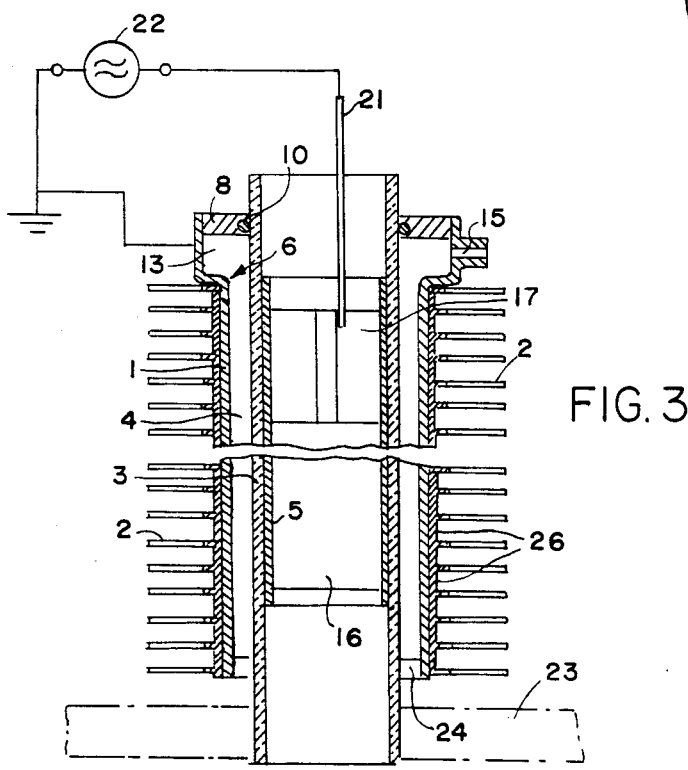
FIG. 3 is a schematic longitudinal section of another preferred embodiment of the ozone generator according to the invention.

In FIG. 3 of the drawing, there is shown another preferred embodiment of the ozone generator according to the invention. This embodiment to a great extent corresponds to that of FIGS. 1 and 2 and corresponding components have thus been given the same reference numerals. The ozone generator of FIG. 3 is intended in particular to be mounted in a supporting structure 23 together with additional ozone generators to form an assembly of ozone generators which may be coupled in series or in parallel. For the sake of clarity, FIG. 3 shows only one ozone generator which is secured to the supporting structure 23 with its dielectric tube 3.

The ozone generator according to FIG. 3 differs from that of FIGS. 1-2 substantially merely in that the oxygen-containing gas does not enter through a collecting chamber 12 but directly in the gap 4 between the outer electrode 1 and the dielectric 3 at the lower portion of the outer electrode 1. In order to support the outer electrode 1 and to maintain it at a correct distance from the dielectric tube 3, there is provided a spacer ring 24 in the gap 4 between the outer electrode 1 and the dielectric 3. To permit supply of oxygen-containing gas to the discharge gap 4, the spacer ring 24 is provided with through-holes.

The previously indicated cooling flanges 2 of the outer electrode 1 may have different designs, but preferably are of the construction shown in FIGS. 1-3 and, more particularly, in FIGS. 2 and 3. The illustrated cooling flanges 2 are of discoid shape having inwardly directed circumferential recesses 25. The discs are disposed substantially at angles, preferably right angles, to the longitudinal axis of the ozone generator and abut on the outer electrode 1 by means of a collar 26 (FIG. 3) which surrounds the central opening of each cooling flange. This central opening has a diameter corresponding to the outer diameter of the outer electrode 1. As appears from FIG. 3, the cooling flanges 2 are mounted on the outer electrode in succession, so that the collar 26 of one cooling flange will rest on the disc of the following cooling flange outside of the electric discharge space of the ozone generator. Preferably, the cooling flanges are comprised of light weight metal or an alloy thereof.

The mode of operation of the ozone generators shown in FIGS. 1-3 will have been appreciated from the foregoing description but, for the sake of completeness, is briefly accounted for below.

An AC voltage is applied over the electrodes by means of the current source 22 while air or oxygen is being fed through the discharge gap 4 between the outer electrode 1 and the dielectric 3. In the embodiment of FIGS. 1-2, feeding is effected by supplying air or oxygen under pressure to the inlet conduit 14, whereas, in the embodiment of FIG. 3, feeding is effected by suction as a result of a partial vacuum produced in the outlet conduit 15. During passage through the discharge gap 4, part of the oxygen in the gas is converted to ozone. By the efficient cooling on the outside as well as the inside of the apparatus according to the invention, the temperature can be maintained at a low level favorable to ozone production.

Finally, it should be noted that even though the body 16, 17 is one of the characteristic features of the invention, it need, of course, not necessarily have the design shown in FIGS. 1-3, but it may be modified in various ways, with the proviso, however, that the body should satisfy the following criteria: a) it should be collapsible for insertion in the inner electrode, b) it should be expandable to abutment against the inner electrode, and c) it should have an "open" construction allowing the throughflow of cooling air.

What is claimed is:

1. A gas-cooled ozone generator having paired tubular concentric electrodes and a solid dielectric disposed therebetween, characterized in that the outer electrode is provided with cooling flanges and spaced from the dielectric such that an annular gap is formed, that the axial ends of said gap are sealed by annular spacers, that the dielectric and the inner electrode have open ends to allow throughflow of cooling gas, and that cooling of the dielectric and of the inner electrode is effected by means of at least one expandable body which is disposed inside the inner electrode, against which the body abuts, and which is open to throughflow of cooling gas, said body comprising a sheet formed into a cylinder with two inwardly directed flanges.

2. Ozone generator as claimed in claim 1, in which the body abutting against the inner electrode further serves as an electric connection for connecting the inner electrode to a voltage source.

3. Ozone generator as claimed in claim 1, in which the body is comprised of a light weight metal or metal alloy.

4. Ozone generator as claimed in claim 3, in which the body is aluminum.

5. Ozone generator as claimed in claim 1, in which the outer electrode is provided with cooling flanges arranged substantially at an angle to the longitudinal axis of the ozone generator.

6. Ozone generator as claimed in claim 5, in which the cooling flanges are discoid shaped.

7. Ozone generator as claimed in claim 5, in which each cooling flange has a central opening of a diameter corresponding to the outer diameter of the outer electrode, and a collar surrounding the central opening and bearing on the outer electrode outside of an electric discharge space of the ozone generator.

8. Ozone generator as claimed in claim 5, in which the cooling flanges are arranged substantially at right angles to the longitudinal axis of the ozone generator.

9. Ozone generator as claimed in claim 4, in which the cooling flanges have inwardly directed recesses.

10. Ozone generator as claimed in claim 4, in which the cooling flanges are comprised of light weight metal or an alloy thereof.

11. Ozone generator as claimed in claim 1, in which the inner electrode is formed by depositing a metal coating on the inner side of the dielectric.

12. Ozone generator as claimed in claim 1, in which the dielectric is formed by depositing a dielectric coating on the outer side of the inner electrode.

13. Ozone generator as claimed in claim 1, in which the outer electrode is comprised of a corrosion-resistant material.

14. Ozone generator as claimed in claim 13, in which the outer electrode is stainless steel.

15. An ozone generator comprising an outer tubular electrode having external flanges adapted for dissipating heat to ambient gases, a tubular dielectric substantially concentrically spaced within said outer electrode, a tubular inner electrode in contact with the inner surface of said dielectric, said dielectric and said inner electrode having a substantially unrestricted bore which has both ends open to throughflow of cooling gases, and a body disposed within and in contact with said inner electrode, said body including means for dissipating heat from said inner electrode to gases passing through said bore of said dielectric, wherein said heat dissipating means comprise a sheet formed into a cylinder with two inwardly directed flanges.

16. An ozone generator as claimed in claim 15 wherein said inner and outer electrodes are both shorter than said dielectric.

17. An ozone generator as claimed in claim 15 wherein said inner and outer electrodes have effective corona-generating lengths which are substantially equal.

18. An ozone generator as claimed in claim 15 wherein said dielectric is spaced within said outer electrode by a distance substantially equal to the thickness of said dielectric.

19. A portable ozone generator comprising an outer tubular electrode having external flanges adapted for dissipating heat to ambient gases, a tubular dielectric substantially concentrically spaced within said outer electrode, a tubular inner electrode in contact with the inner surface of said dielectric, said dielectric and said inner electrode having a substantially unrestricted bore which has both ends open to throughflow of cooling gases, and a body disposed within and in contact with said inner electrode, said body including an expandable tubular portion which in expanded form firmly abuts said inner electrode and reinforces said dielectric and inner electrode, said body comprising a sheet formed into a cylinder with two inwardly directed flanges.

* * * * *